United States Patent [19]

Lord

[11] 3,781,571

[45] Dec. 25, 1973

[54] LOOP CURRENT DETECTOR

[75] Inventor: Michael Robert Lord, Basildon, England

[73] Assignee: International Standard Electric Corporation, New York, N.Y.

[22] Filed: Dec. 6, 1971

[21] Appl. No.: 205,352

Related U.S. Application Data

[63] Continuation of Ser. No. 10,365, Feb. 11, 1970, abandoned.

[52] U.S. Cl..... 307/235 R, 179/16 AA, 179/16 EA, 179/18 FA

[51] Int. Cl. .......... H04m 3/18, H04 3/06

[58] Field of Search .......... 307/235, 297; 324/140 R; 179/18 FA, 16 EA, 16 AA, 78 R

[56] References Cited

UNITED STATES PATENTS

| | | | |
|---|---|---|---|
| 3,579,106 | 5/1971 | Lord | 179/18 FA |
| 2,984,752 | 5/1961 | Giacoletto | 307/300 |
| 3,412,264 | 11/1968 | Preston | 307/235 |
| 2,767,330 | 10/1956 | Marshall | 307/235 X |
| 3,156,778 | 11/1964 | Cirone | 179/18 FA |
| 3,410,961 | 11/1968 | Slana | 179/18 FA |
| 3,478,175 | 11/1969 | Herter | 179/18 FA |
| 3,525,816 | 8/1970 | Herter | 179/18 FA |

*Primary Examiner*—John W. Huckert
*Assistant Examiner*—L. N. Anagnos
*Attorney*—C. Cornell Remsen, Jr. et al.

[57] ABSTRACT

A detector is provided for unidirectional currents flowing in a loop circuit. A dc amplifier coupled to a resistor in the loop provides an output signal proportional to the loop current. A voltage drop across a second resistor in the loop is supplied to the input of a voltage threshold detector and to the output of said amplifier. Means are provided to indicate when said input is less or greater than a reference voltage.

6 Claims, 3 Drawing Figures

PATENTED DEC 25 1973

3,781,571

Inventor
M. R. Lord

By D.O. Warner
Attorney

LOOP CURRENT DETECTOR

This is a continuation of application Ser. No. 010,365 filed Feb. 11, 1970, now abandoned.

The present invention relates to a detector for unidirectional currents and in particular to a modification of a circuit described in a co-pending U.S. Pat. Application, Ser. No. 775,600 now U.S. Pat. No. 3,579,106.

In the detector of the parent specification unidirectional currents flowing in a subscriber loop are detected by coupling to each leg of the loop a d.c. amplifier which gives an output current proportional to the loop current. By combining said output currents, by comparing the resultant current with a reference current and by indicating when the resultant current is less or greater than the reference current, the indication is made independent of any longitudinal currents induced in the loop.

The present invention constitutes a simplification of the circuit of the U.S. Pat. No. 3,579,106, referred to above. In the present invention, a detector is provided for unidirectional currents flowing in a loop circuit. A resistor is connected in each leg of the loop. A d.c. amplifier is coupled to a first of said resistors to give an output current proportional to said loop current. A voltage threshold detector is provided. Means are provided to couple the voltage drop across the second resistor to the input of the voltage threshold detector and also to couple the output of said amplifier to the input of the voltage threshold detector. The threshold detector supplies outputs and to indicate when said input is less or greater than a reference voltage, the indications being independent of any longitudinal currents flowing in the loop.

The invention will now be described with reference to the figure of the accompanying drawing showing in schematic form the detector according to an embodiment of the invention.

In the figure a 2-wire subscriber loop circuit is indicated by conductors 1 and 2 which are connected at the exchange to a battery of voltage V via resistors $R_1$ and $R_2$. These resistors limit the loop current in the event of a short circuit and provide a voltage drop proportional to the current flowing in each leg.

The voltage drop $V_1$ developed across resistor $R_1$ by the loop current is applied via resistor $R_3$ to the base electrode of transistor $VT_2$, which acts as a voltage threshold detector.

The voltage drop $V_2$ developed across resistor $R_2$ is applied to the input of a d.c. amplifier comprising transistor $VT_1$. The output of this amplifier is also connected to the input of the threshold detector.

Figure 1:
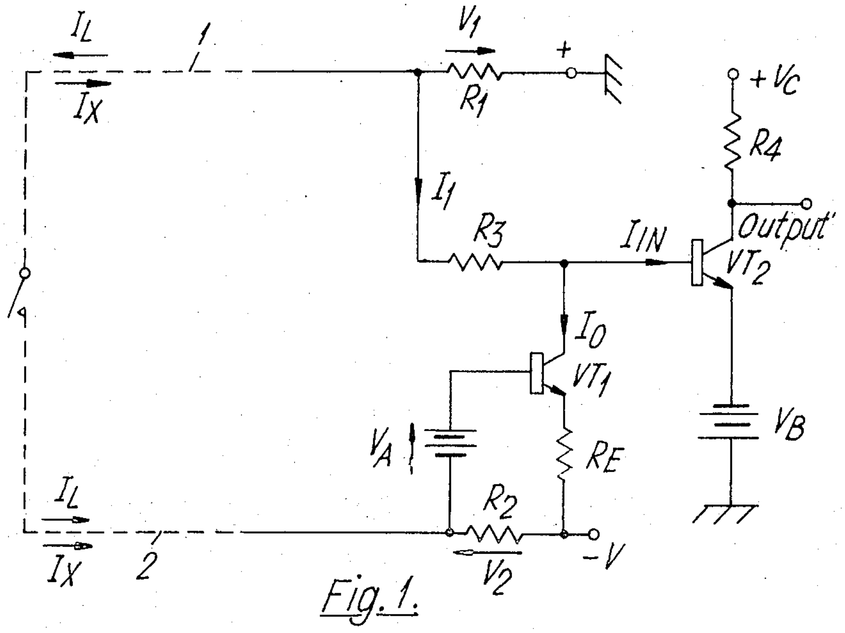
Figure 2A:
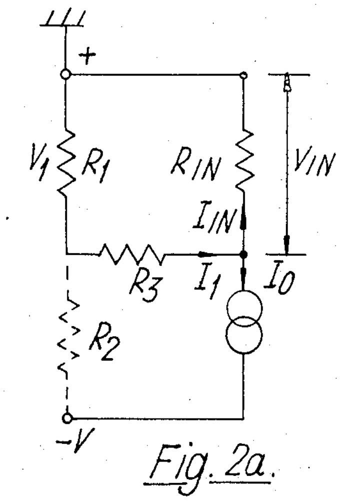

To calculate the voltage $V_{IN}$ applied to the input of the threshold detector, having an input impedance $R_{IN}$, by the voltage drop $V_1$ across resistor $R_1$ and by the output current $I_o$ of the d.c. amplifier the simplifying assumptions will be made that $R_1 = R_2$, that is that $V_1 = V_2$ and that $R_3 > R_1$ The simplified equivalent network is shown in FIG. 2 in which the same designations are used as in FIG. 1.

Figure 2B:
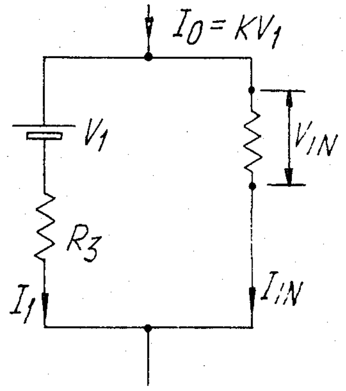

As $R_3$ $R_1$ the voltage drop produced in $R_1$ by $I_1$ can be neglected, so that the circuit further simplifies to that shown in FIG. 2*b*.

Designating by $I_{IN}$ the input current to the detector we have $$I_{IN} R_{IN} = V_1 + I_1 R_3 = V_1 + I_o R_3 - I_{IN} R_3$$

rearranging $$I_{IN} = (V_1 + I_o R_3)/(R_{IN} + R_3) = (V_{IN})/(R_{IN})$$

thus $$V_{IN} = R_{IN}/(R_{IN} + R_3)(V_1 + I_o R_3) = (R_{IN})/(R_{IN} + R_3)(V_1 + KV_1 R_3) \quad (1)$$

where $K = (I_o/V_2)$ and is chosen to equal $1/R_3$ therefore $$V_{IN} = 2 V_1 (R_{IN})/(R_{IN} + R_3) \quad (2)$$

As $V_1$ is proportional to the loop current $I_L$ the voltage $V_{IN}$ is also proportional to $I_L$ so that by choosing a suitable value of voltage threshold the detector will give an output when $I_L$ exceeds a predetermined value.

A longitudinal current $I_x$ superimposed an $I_L$ in the direction shown will increase the current flowing in leg 1 of the loop and decrease the current flowing in leg 2 of the loop, so that the total voltage drop $V_1 + V_2$ remains unaffected by $I_x$ and does not influence the indication of the detector.

Neglecting the base-emitter voltages and assuming infinite current gain ($h_{FE}$) of transistor $VT_1$ then $$I_o = (V_2 + V_A/R_E) \quad (3)$$

Where $V_A$ is a bias applied to the base of the transistor and $R_E$ is a resistor connected in series with the emitter electrode.

If $R_E$ is made equal to $R_3$ then $$I_o = V_2/R_3 + V_A/R_3 = KV_2 + KV_A$$

where $K = 1/R_3$ as required by the transition from expression (1) to (2). The term $KV_A$ is a constant and affects only the magnitude of the threshold.

The input circuit of the voltage threshold detector $VT_2$ is provided with a bias battery $V_B$. Neglecting again the base-emitter potential of $VT_2$ and assuming an infinite $h_{FE}$ the transistor will be turned off when $V_{IN}$ is more negative than $V_B$ and turned on when $V_{IN}$ is less negative than $V_B$.

A feature of the present invention and of the main patent is the relative insensitivity of the circuits to changes of voltage of the battery supplying the loop current. Since the output current $I_o$ of the d.c. amplifier is proportional to the loop current, a given percentage change of battery voltage will produce approximately the same percentage change of $I_o$ and input voltage to the threshold detector. This effect can be compensated even further by deriving the bias voltage $V_B$ from the same battery supplying the loop current. This is achieved by connecting the emitter electrode of $VT_2$ to a tap of a potential divider connected across the battery *V*.

I claim:

1. A detector for detecting unidirectional loop currents while providing compensation to avoid measuring longitudinal currents flowing through a closed circuit formed to include first and second legs terminating respectively at ground potential and at d.c. potential, said detector comprising a first resistor coupled in the first leg of the circuit between a first terminal and ground potential, a second resistor coupled in the second leg of the circuit, a third resistor coupled to the first resistor via said first terminal to provide a path for a first output current proportional to current in the first leg of the closed circuit, a d.c. amplifier coupled to the second resistor to provide a second output current proportional to current in the second leg of the circuit, a voltage threshold detector, means coupling said first output current from said third resistor and said second output current from said d.c. amplifier to the input terminal of said threshold detector, said threshold detector responding to said first and second output currents to provide an output potential proportional to the loop currents flowing in the loop and independent of any longitudinal currents flowing in the loop.

2. A detector as claimed in claim 1 in which the direct current amplifier and the voltage threshold detector each include transistor circuits.

3. A detector as claimed in claim 1 in which the ratio of the voltage drop across said first resistor to the output current of the amplifier is equal to the value of said coupling resistor.

4. A detector as claimed in claim 3 in which the amplifier includes a transistor, the input circuit to the transistor includes a biasing resistor of value equal to said third resistor, the former being connected in series with the emitter electrode of the transistor.

5. A detector as claimed in claim 4 in which a source of bias potential is provided in series with the emitter electrode of the transistor acting as a voltage threshold detector.

6. A detector as claimed in claim 5 in which the source of bias potential to the emitter of the voltage threshold detector is a voltage drop derived from a potential divider connected across the battery supplying the loop current.

* * * * *